(12) United States Patent
Hamilton et al.

(10) Patent No.: US 8,548,910 B1
(45) Date of Patent: Oct. 1, 2013

(54) ADDRESS CHANGE NOTIFICATION

(75) Inventors: Shea Cordell Hamilton, McKinney, TX (US); Robert T. Nguyen, Double Oak, TX (US)

(73) Assignee: Bank of America Corporation, Charlotte, NC (US)

(*) Notice: Subject to any disclaimer, the term of this patent is extended or adjusted under 35 U.S.C. 154(b) by 713 days.

(21) Appl. No.: 12/543,735

(22) Filed: Aug. 19, 2009

(51) Int. Cl.
*G06Q 40/00* (2012.01)

(52) U.S. Cl.
USPC .......................................................... 705/42

(58) Field of Classification Search
USPC .......................................................... 705/42
See application file for complete search history.

(56) References Cited

U.S. PATENT DOCUMENTS

| | | | |
|---|---|---|---|
| 2004/0153663 A1* | 8/2004 | Clark et al. | 713/200 |
| 2007/0300143 A1* | 12/2007 | Vanderport et al. | 715/500 |
| 2008/0301019 A1* | 12/2008 | Monk | 705/35 |

OTHER PUBLICATIONS

Paustian, Chuck. Credit Card management; PtoQuest; 9.8 (Nov. 1996):107-111.*
Bardley, Keith. Business Stretegy Review 8.1 (Spring 1997): 53-62.*
Green, Jeffrey. Creidt Card management ; An old debate with a new spin; 10.12 (Mar. 1998): 14-18.*

* cited by examiner

*Primary Examiner* — Hani M Kazimi
*Assistant Examiner* — Hatem M Ali
(74) *Attorney, Agent, or Firm* — Banner & Witcoff, Ltd.; Michael A. Springs (57) ABSTRACT

A notification about an address change request to a customer may be generated by processing account information. An address change request for an account is received, and account information is compared to threshold information. If balance information exceeds threshold limits, the account holder is notified at the address or telephone number of record. Different threshold limits may be applied to different types of accounts. When the new address for a change request matches on-line banking information or information from a national change of address (NCOA) database, the change request may be excluded from further processing so that a notification is not generated. Only one notification to the account holder may be generated when the account holder has more than one account with a financial institution. Processing parameters may be adjusted based on exclusions and inclusions by modifying threshold limits from previously determined notifications.

22 Claims, 12 Drawing Sheets

ADDRESS CHANGE NOTIFICATION

FIELD OF THE INVENTION

Aspects of the invention generally relate to notifying an account holder about an address change request with a financial institution.

BACKGROUND

Bank fraud is the use of fraudulent means to obtain money, assets, or other property owned or held by a financial institution. The are numerous variations of bank fraud, including credit card fraud, stolen and altered checks, check kiting, fraudulent loans, and wire fraud. Bank fraud is a pervasive and growing problem. For example, financial industry sources estimate that losses associated with credit card fraud are in the billions of dollars annually in the United States alone. The adverse effects of bank fraud are compounded by the different aspects of fraud and by the globalization of bank fraud, where fraud perpetrated in one country can victimize people in another country.

On an individual basis, a perpetrator can all-too-easily obtain important information of a victim. For example, a perpetrator can abscond with a victim's pre-approved credit card offer from the victim's mailbox or trash can. The perpetrator can then mail in the offer with a change of address request and start spending on the victim's bogus account. The perpetrator can even apply for a credit card in the victim's name if the perpetrator has the right information. The victim will not know a thing about the fraud until the credit card company tracks the victim down and demands payment for the purchases that the perpetrator has a racked up. With a victim's name, social security number, and date of birth, the perpetrator can get loans, access the victim's existing bank accounts, open new bank accounts, lease or buy cars, get insurance, and so forth.

Reducing bank fraud is consequently important to the preventing monetary losses to financial institutions and especially to bank customers, who often must expend substantial time in resolving the fraud and as well as experience psychological anguish.

BRIEF SUMMARY

Aspects of the invention address one or more of the issues mentioned above by disclosing methods, computer readable media, and apparatuses for notifying customers of an address change request for an account based on processing of account information.

With another aspect of the invention, an address change request for an account is received, and account information is compared to threshold information. If balance information exceeds threshold limits, the account holder is notified at the address or telephone number of record. Different threshold limits may be applied to different types of accounts, e.g., deposit accounts and credit card accounts.

With another aspect of the invention, when the new address for a change request matches on-line banking (OLB) information, the change request is excluded from further processing so that a notification is not generated.

With another aspect of the invention, only one notification to the account holder is generated when the account holder has more than one account with a financial institution.

With another aspect of the invention, when the new address for a change request matches information from a national change of address (NCOA) database, the change request is excluded.

With another aspect of the invention, when the ZIP code of the new address is a high-risk ZIP code, a notification is sent to the account holder.

With another aspect of the invention, processing parameters are adjusted based on exclusions and inclusions. Threshold limits may be modified for previously determined notifications that result in undetected fraud occurrences and false fraud occurrences.

Aspects of the invention may be provided in a computer-readable medium having computer-executable instructions to perform one or more of the process steps described herein.

These and other aspects of the invention are discussed in greater detail throughout this disclosure, including the accompanying drawings.

BRIEF DESCRIPTION OF THE DRAWINGS

The present invention is illustrated by way of example and not limited in the accompanying figures in which like reference numerals indicate similar elements and in which.

DETAILED DESCRIPTION

In accordance with various aspects of the invention, methods, computer-readable media, and apparatuses are disclosed in which a financial institution monitors address change requests for accounts and determines when to notify the customer about the request.

According to traditional approaches, financial institutions (e.g., banks) often lack sufficient monitoring to insure that account maintenance performed by associates on the customer address profile is appropriate and authorized. Confirmations to indicate complication of address change are often sent to customers with an inconsistent process. With traditional banking approaches, a banking associate submits a request for a notification to be mailed out. As a result, changes can be used to enable internal and external fraud by preventing the delivery of key documents that would expose issues to the customer. Otherwise, for example, a fraudster can use a document if directly delivered to an alternate location. There are inherent risks with traditional approaches due to high volume and the bank's dependency on accurate profile information as a communication link to customers.

Notifying a customer of completed address change maintenance provides written confirmation of a requested change while prompting the customer to act and advise the financial institution of unauthorized maintenance. Address change notification is a red flag under the Fair and Accurate Credit Transactions (FACT) Act provisions and must be addressed. Notifying the customer of completed address change maintenance provides confirmation of a requested change while prompting the customer to act and advise the financial institution of unauthorized maintenance.

Embodiments of the invention support financial institutions, including banks, stock brokers, and insurance companies. However, some embodiments may support other types of organizations such as retailers and governmental organizations. For example, a retailer may provide an account to a customer so that the customer can charge purchases on a store card. Other embodiments may support gas cards and online purchases in which the customer has to provide an account number.

Figure 1:
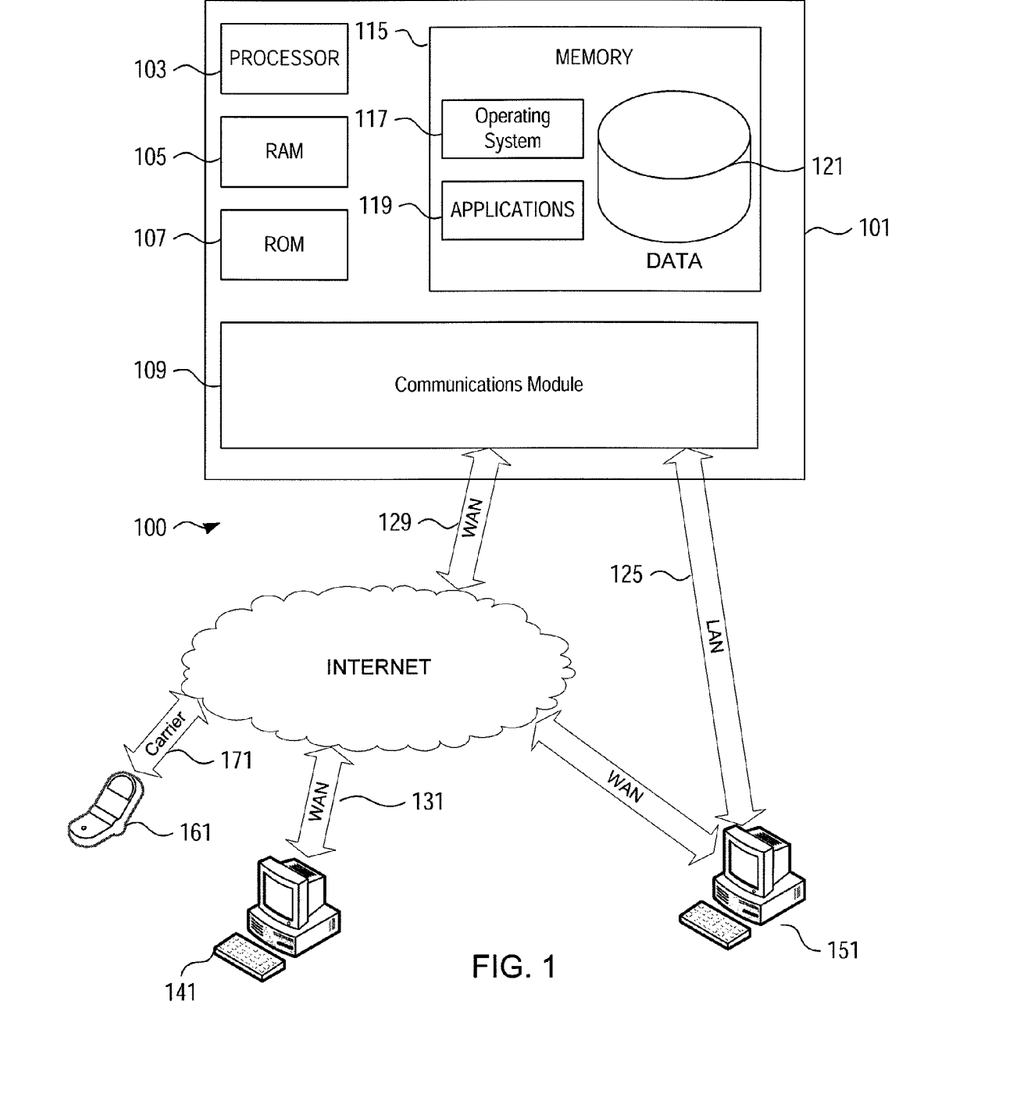
FIG. 1 shows an illustrative operating environment in which various aspects of the invention may be implemented.

FIG. 1 illustrates an example of a suitable computing system environment 100 (e.g., for supporting system 300 and processes 400, 1100, and 1200 as shown in FIGS. 3, 4, 11, and 12, respectively) that may be used according to one or more illustrative embodiments. The computing system environment 100 is only one example of a suitable computing environment and is not intended to suggest any limitation as to the scope of use or functionality of the invention. The computing system environment 100 should not be interpreted as having any dependency or requirement relating to any one or combination of components shown in the illustrative computing system environment 100.

The invention is operational with numerous other general purpose or special purpose computing system environments or configurations. Examples of well known computing systems, environments, and/or configurations that may be suitable for use with the invention include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

With reference to FIG. 1, the computing system environment 100 may include a computing device 101 wherein the processes discussed herein may be implemented. The computing device 101 may have a processor 103 for controlling overall operation of the computing device 101 and its associated components, including RAM 105, ROM 107, communications module 109, and memory 115. Computing device 101 typically includes a variety of computer readable media. Computer readable media may be any available media that may be accessed by computing device 101 and include both volatile and nonvolatile media, removable and non-removable media. By way of example, and not limitation, computer readable media may comprise a combination of computer storage media and communication media.

Computer storage media include volatile and nonvolatile, removable and non-removable media implemented in any method or technology for storage of information such as computer readable instructions, data structures, program modules or other data. Computer storage media include, but is not limited to, random access memory (RAM), read only memory (ROM), electronically erasable programmable read only memory (EEPROM), flash memory or other memory technology, CD-ROM, digital versatile disks (DVD) or other optical disk storage, magnetic cassettes, magnetic tape, magnetic disk storage or other magnetic storage devices, or any other medium that can be used to store the desired information and that can be accessed by computing device 101.

Communication media typically embodies computer readable instructions, data structures, program modules or other data in a modulated data signal such as a carrier wave or other transport mechanism and includes any information delivery media. Modulated data signal is a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media.

Computing system environment 100 may also include optical scanners (not shown). Exemplary usages include scanning and converting paper documents, e.g., correspondence, receipts, etc. to digital files.

Although not shown, RAM 105 may include one or more are applications representing the application data stored in RAM memory 105 while the computing device is on and corresponding software applications (e.g., software tasks), are running on the computing device 101.

Communications module 109 may include a microphone, keypad, touch screen, and/or stylus through which a user of computing device 101 may provide input, and may also include one or more of a speaker for providing audio output and a video display device for providing textual, audiovisual and/or graphical output.

Software may be stored within memory 115 and/or storage to provide instructions to processor 103 for enabling computing device 101 to perform various functions. For example, memory 115 may store software used by the computing device 101, such as an operating system 117, application programs 119, and an associated database 121. Alternatively, some or all of the computer executable instructions for computing device 101 may be embodied in hardware or firmware (not shown).

Database 121 may provide centralized storage of account data. Processor 103 may access the account data from database 121 and process the account data according to processing parameters, e.g., threshold information, as further discussed.

Computing device 101 may operate in a networked environment supporting connections to one or more remote computing devices, such as branch terminals 141 and 151. The branch computing devices 141 and 151 may be personal computing devices or servers that include many or all of the elements described above relative to the computing device 101. Branch computing device 161 may be a mobile device communicating over wireless carrier channel 171.

The network connections depicted in FIG. 1 include a local area network (LAN) 125 and a wide area network (WAN) 129, but may also include other networks. When used in a LAN networking environment, computing device 101 is connected to the LAN 825 through a network interface or adapter in the communications module 109. When used in a WAN networking environment, the server 101 may include a modem in the communications module 109 or other means for establishing communications over the WAN 129, such as the Internet 131. It will be appreciated that the network connections shown are illustrative and other means of establishing a communications link between the computing devices may be used. The existence of any of various well-known protocols such as TCP/IP, Ethernet, FTP, HTTP and the like is presumed, and the system can be operated in a client-server configuration to permit a user to retrieve web pages from a web-based server. Any of various conventional web browsers can be used to display and manipulate data on web pages. The network connections may also provide connectivity to a CCTV or image/iris capturing device.

Additionally, one or more application programs 119 used by the computing device 101, according to an illustrative embodiment, may include computer executable instructions for invoking user functionality related to communication including, for example, email, short message service (SMS), and voice input and speech recognition applications.

Embodiments of the invention may include forms of computer-readable media. Computer-readable media include any available media that can be accessed by a computing device 101. Computer-readable media may comprise storage media and communication media. Storage media include volatile and nonvolatile, removable and non-removable media implemented in any method or technology for storage of information such as computer-readable instructions, object code, data structures, program modules, or other data. Communication media include any information delivery media and typically embody data in a modulated data signal such as a carrier wave or other transport mechanism.

Although not required, one of ordinary skill in the art will appreciate that various aspects described herein may be embodied as a method, a data processing system, or as a computer-readable medium storing computer-executable instructions. For example, a computer-readable medium storing instructions to cause a processor to perform steps of a method in accordance with aspects of the invention is contemplated. For example, aspects of the method steps disclosed herein may be executed on a processor on a computing device 101. Such a processor may execute computer-executable instructions stored on a computer-readable medium.

Figure 2:
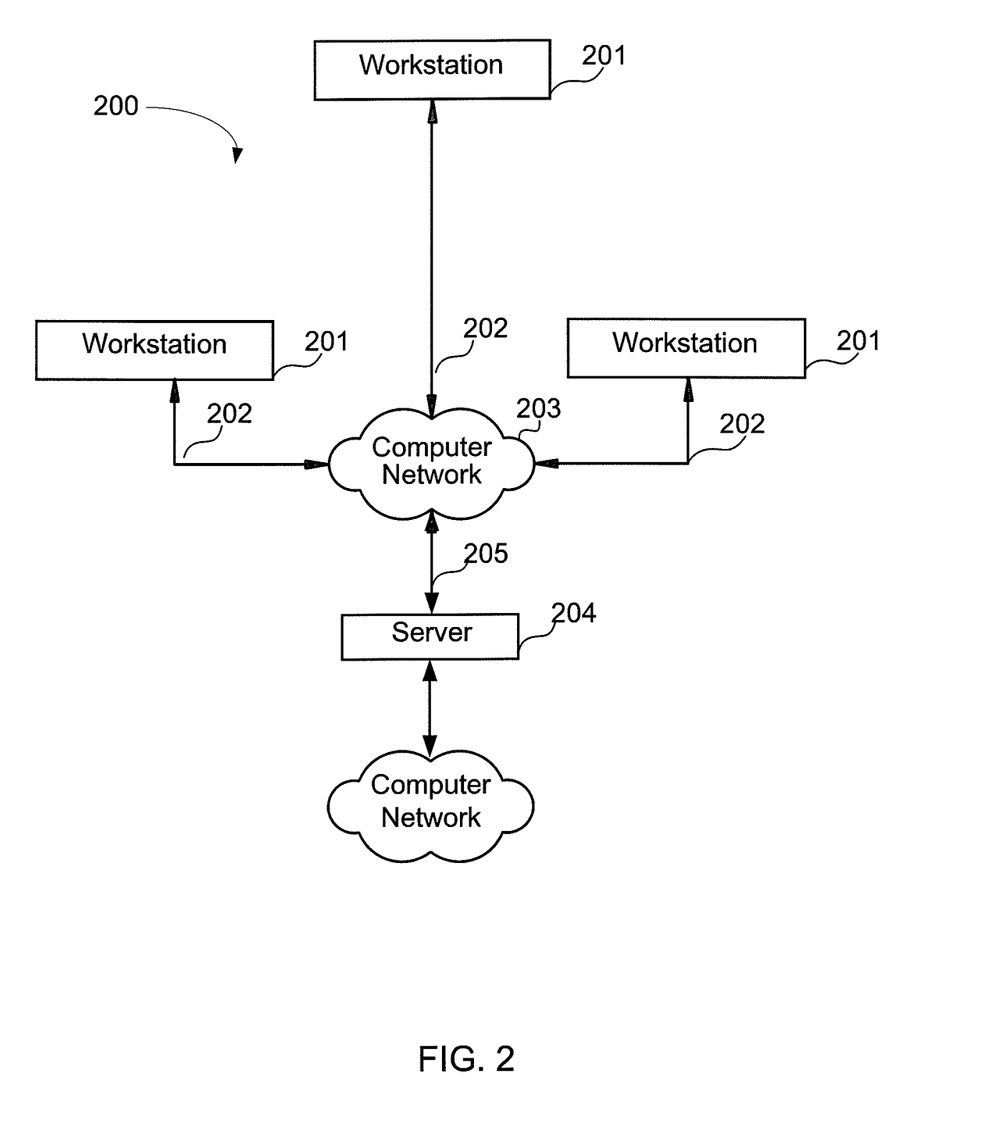
FIG. 2 is an illustrative block diagram of workstations and servers that may be used to implement the processes and functions of certain aspects of the present invention.

Referring to FIG. 2, an illustrative system 200 for implementing methods according to the present invention is shown. As illustrated, system 200 may include one or more workstations 201. Workstations 201 may be local or remote, and are connected by one of communications links 202 to computer network 203 that is linked via communications links 205 to server 204. In system 200, server 204 may be any suitable server, processor, computer, or data processing device, or combination of the same. Server 204 may be used to process the instructions received from, and the transactions entered into by, one or more participants.

Computer network 203 may be any suitable computer network including the Internet, an intranet, a wide-area network (WAN), a local-area network (LAN), a wireless network, a digital subscriber line (DSL) network, a frame relay network, an asynchronous transfer mode (ATM) network, a virtual private network (VPN), or any combination of any of the same. Communications links 202 and 205 may be any communications links suitable for communicating between workstations 201 and server 204, such as network links, dial-up links, wireless links, hard-wired links, etc. Connectivity may also be supported to a CCTV or image/iris capturing device.

As understood by those skilled in the art, the steps that follow in the Figures may be implemented by one or more of the components in FIGS. 1 and 2 and/or other components, including other computing devices.

Figure 3:
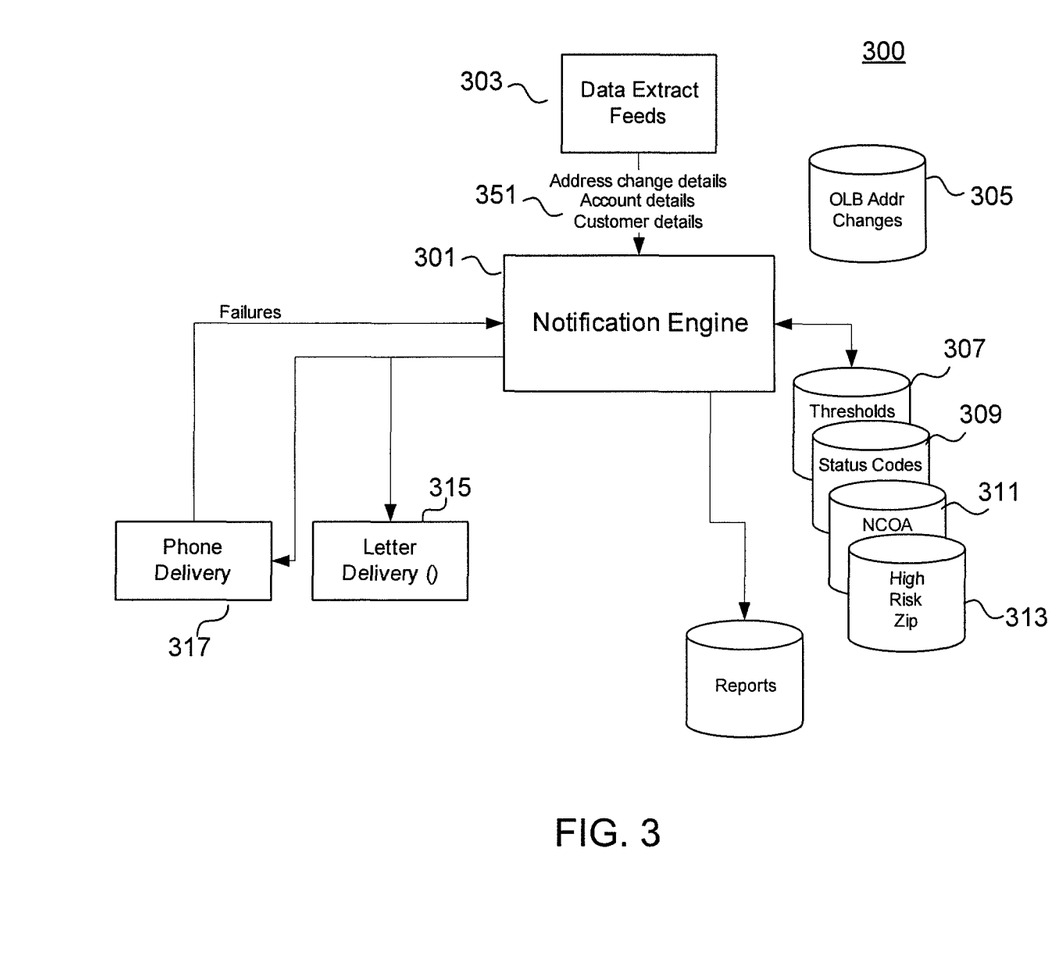
FIG. 3 shows a system that processes an address change request and determines if an address change notification should be generated in accordance with an aspect of the invention.

FIG. 3 shows system 300 that processes an address change request and determines if an address change notification should be generated in accordance with an aspect of the invention. Notifying the customer of completed address change maintenance provides confirmation of a requested change while prompting the customer to act and advise the financial of unauthorized maintenance. An address change notification functions as a red flag under the provisions of the Fair and Accurate Credit Transactions (FACT) Act of 2003.

Notification engine 301 receives data 351 that may include address change details, account details, and customer details from data extract feeds 303. Customers may request an address change for one or more accounts through a telephone call, U.S. postal mail, or e-mail. However, the financial institution typically does not know with certainty whether the requester is the customer or a fraudster. With an address change request, the customer typically requests that the address of record (old address) should be changed to a new address. Consequently, notification engine processes address change requests from data extract feeds 303 to determine if the request is legitimate based on account information as will be discussed. Alternatively or in addition, a customer may request an address change through the financial institution's website (corresponding to on-line banking (OLB) changes 305). With some embodiments, notification engine 301 treats address changes through the financial institution's website as being secure based on the website's authentication procedures (e.g., password and/or PIN).

Notification engine 301 typically processes many address change requests (often in the thousands) so that fast but accurate processing of a request is desirable. Because the typical number of processed requests is large, notification engine 301 is typically configured to detect a desired amount of fraud while reducing the number of notifications. If the number of notifications is too large, the banking processing center can be overwhelmed while unnecessarily involving many customers in non-fraudulent situations.

Notification engine 303 compares account information from data extract feeds 303 with processing information from thresholds database 307, status codes database 309, National Change of Address (NCOA) database 311, and high risk zip code database 313 to determine if the address change request is possibly fraudulent. (Processing by notification engine 301 is further discussed with FIGS. 4-12.) If so, notification engine 301 generates a notification to the holder of the account based on the telephone number of record through phone delivery 317 and/or based on the address of record through letter delivery 315. With some embodiments, the notification may be sent to the e-mail address of record. With some embodiments, notification engine 301 may first attempt to contact the customer to the telephone number of record. If the call is unsuccessful, notification engine 301 may initiate the mailing of a post card or letter to the customer at the address of record. Other embodiments may execute different notification strategies, e.g., both calling the customer as well as mailing a notification to the customer.

Notification engine 301 generates reports 319 that include information about address change requests so that a fraud specialist can do a post-mortem analysis to determine whether notification engine 301 is performing within performance objectives. If not, performance parameters may be adjusted for processing future address change requests.

Different categories of users may access system 300. For example, a user may be categorized into one of four groups: guest (general) user, fraud user, operational user, and administrator, where each group may execute different permitted actions. A guest user may be restricted only to viewing reports and outcomes. A fraud user can do what the guest user can do as well as change threshold values. An operational user can change the return address of mailed notifications and the verbiage of dialed notifications. An administrator can perform all the functions of a guest user, fraud user, and operational user as well as add or delete users.

Figure 4:
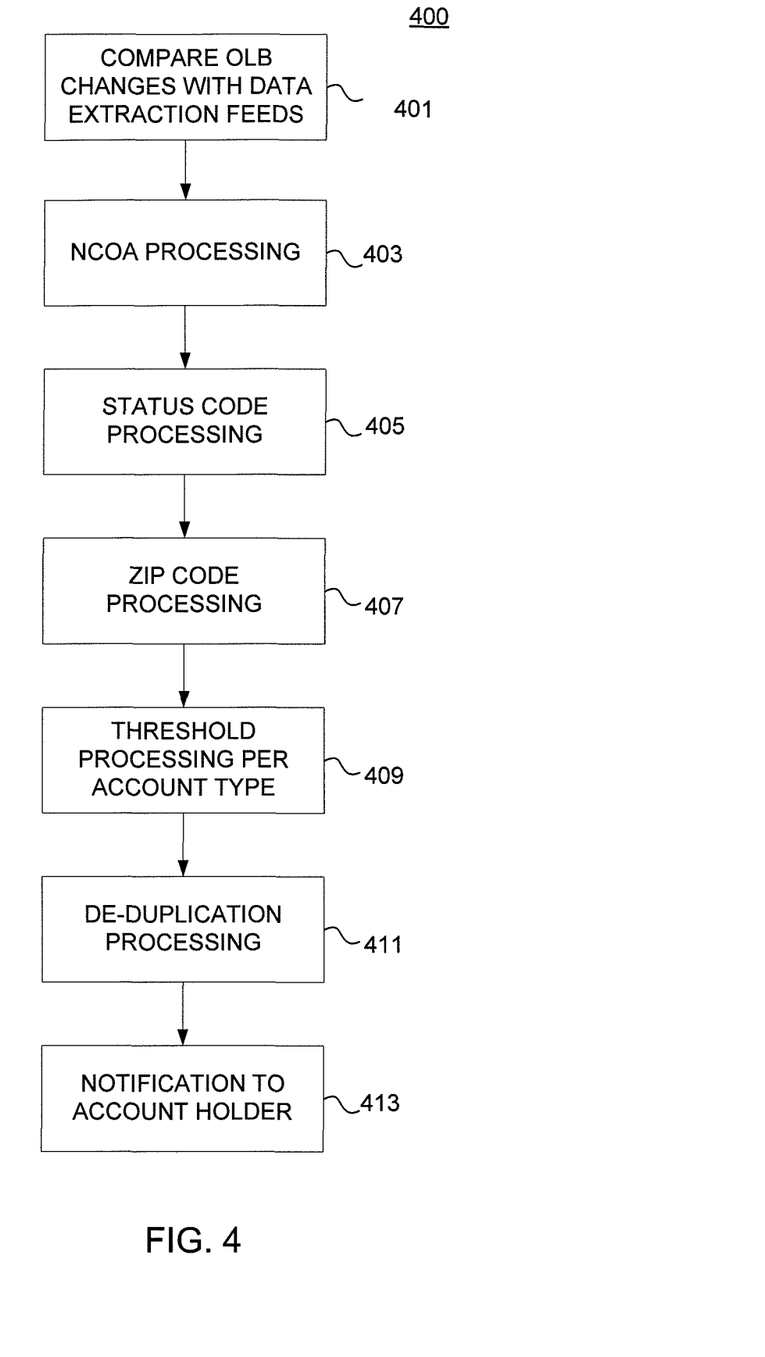
FIG. 4 shows a flow diagram for processing address change requests in accordance with an aspect of the invention.

FIG. 4 shows flow diagram 400 for processing address change requests in accordance with an aspect of the invention. With some embodiments, the address change request may be associated with one or more accounts of the customer. In step 401, notification engine 301 compares address change requests from data extract feeds 303 with address change requests through on-line banking (OLB) if the customer submitted address change requests through both the bank's authenticated website and another delivery channel (e.g., US mail or telephone call). If the new addresses match, then notification engine 301 excludes the address change request from further processing so that no address notification is provided to the customer of record. When an address change is excluded from further processing, then a change notification is not sent to the customer.

Notification engine 301 then processes address change requests from data extract feeds 303 by comparing the new address with the updated address provided by NCOA database 311 (if one is available corresponding to the customers name and old address) in step 403. NCOA database 311 typically assists in correcting address lists electronically by identifying, via strict U.S. Postal Service (USPS) approved name and addressing logic, individuals and businesses that have moved within the last three years.

In steps 405 and 407, the status code and zip code, respectively, are compared with lists as will be further discussed. In step 409, account information is processed to determine whether the balance of the account is greater than a predetermined threshold. If so, a change address notification is provided to the customer at the address or telephone number of record in step 413.

While embodiments may process change requests in an order as shown in flow diagram 400, other embodiments may process change requests in a different ordering. For example, threshold processing 409 may be performed before zip code processing 407, or NCOA processing 403 may be performed before comparing OLB changes 401.

Because a customer may have multiple accounts with the financial institution, step 411 ascertains that only one notification is provided to the customer if multiple address change requests were submitted by the customer. Sending multiple notifications to a customer may confuse the customer as well as increase demands on system 300.

Figure 5:
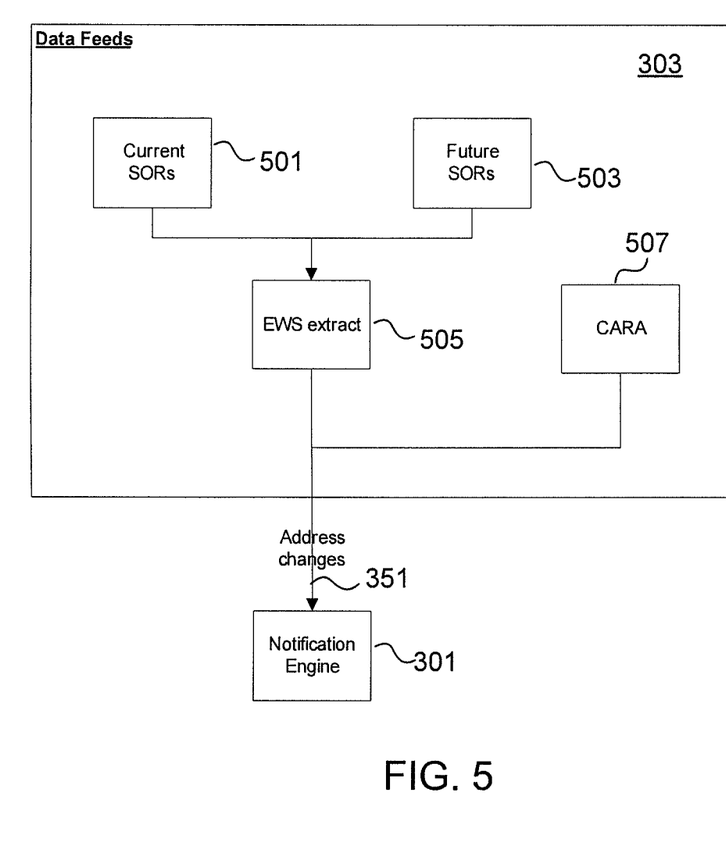
FIG. 5 shows a data extract feeds in accordance with an aspect of the invention.

FIG. 5 shows data extract feeds 303 in accordance with an aspect of the invention. With some embodiments, data extract feeds 303 provide address change information (current SORs (System of Record) 501 and future SORs 503) to notification engine 301 for deposits through extraction module 505 and for credit cards through extraction module 505. Other embodiments may support other types of financial products, including insurance policies, mortgages, and debit cards.

Figure 6:
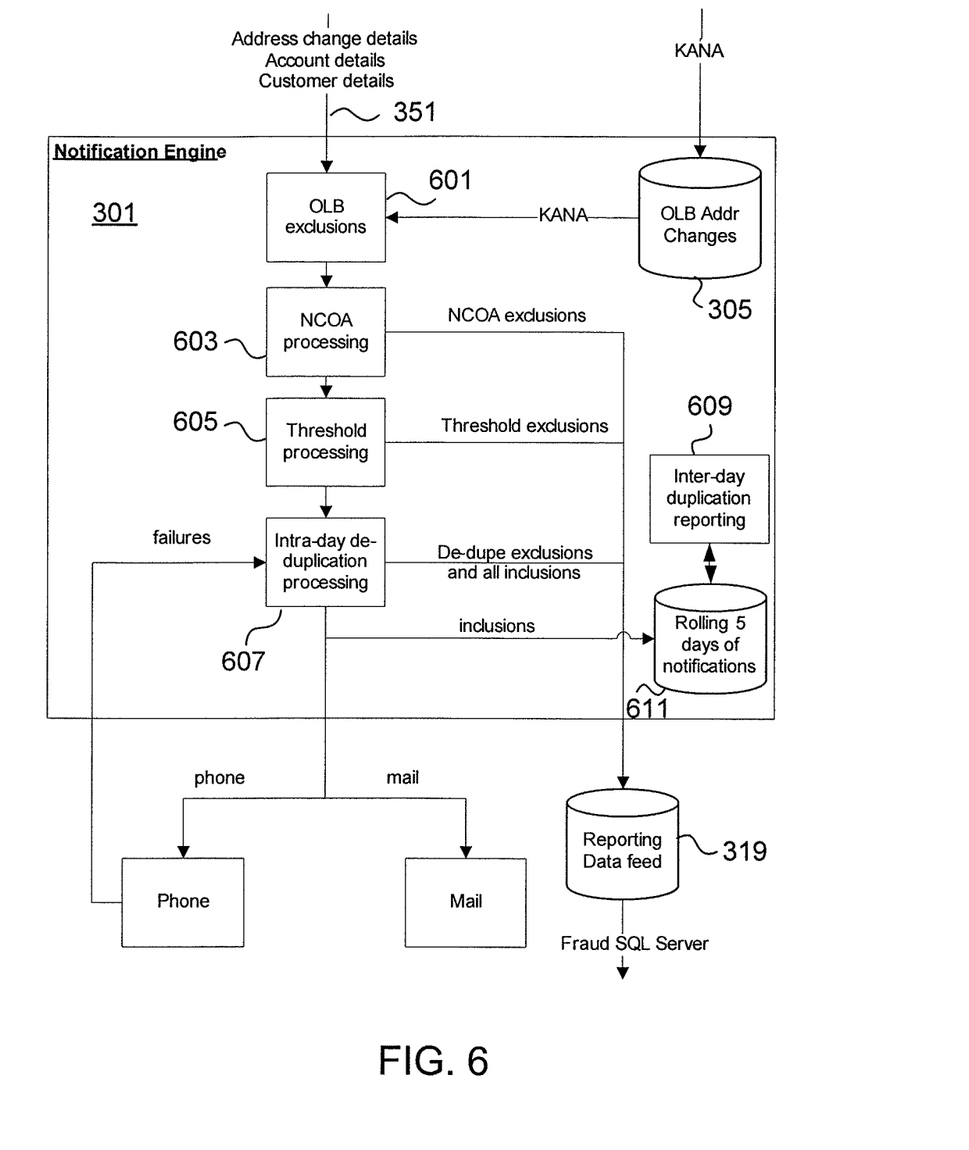
FIG. 6 shows a notification engine in accordance with an aspect of the invention.

FIG. 6 shows notification engine 301 in accordance with an aspect of the invention. As previously discussed, notification engine 301 receives address change information 351 from data feeds 303. A change request is excluded from further processing if OLB exclusions processing 601 detects a match with address information from OLB database 305. NCOA processing 603 detects a match with address information from the NCOA database, or threshold processing 605 determines if account balances are less than threshold limits.

De-duplication processing 607 eliminates duplication of notifications so that a customer receives a notification for only one account during a predetermined time duration when the customer has multiple accounts at the financial institution. However, de-duplication processing 607 might not be able to avoid notification duplication when notifications for different accounts of the customer are generated outside the predetermined time duration. In order to avoid duplication in such cases, database 611 may maintain notification records for the last five days (or some other specified period of time). Reporting module 609 consequently generates duplication reporting over the last five days.

With some embodiments, de-duplication processing 607 may access database 611 before generating a notification in order to avoid notification duplication over the time duration that database 611 stores notification data. However, the additional processing time may be increased because of the database access.

Database 319 stores information about both inclusions and exclusions so that fraud specialists can study the effectiveness of notification engine 301 subsequent to engine 301 determining whether to generate a notification of an address change request. From this information, a fraud specialist can determine whether too many notifications are being generated for non-fraudulent requests. On the other hand, the fraud specialist may determine that too few notifications are not being sent for fraudulent change requests. From the analysis, processing parameters (e.g., as balance thresholds) may be adjusted to achieve desired performance objectives.

Figure 7:
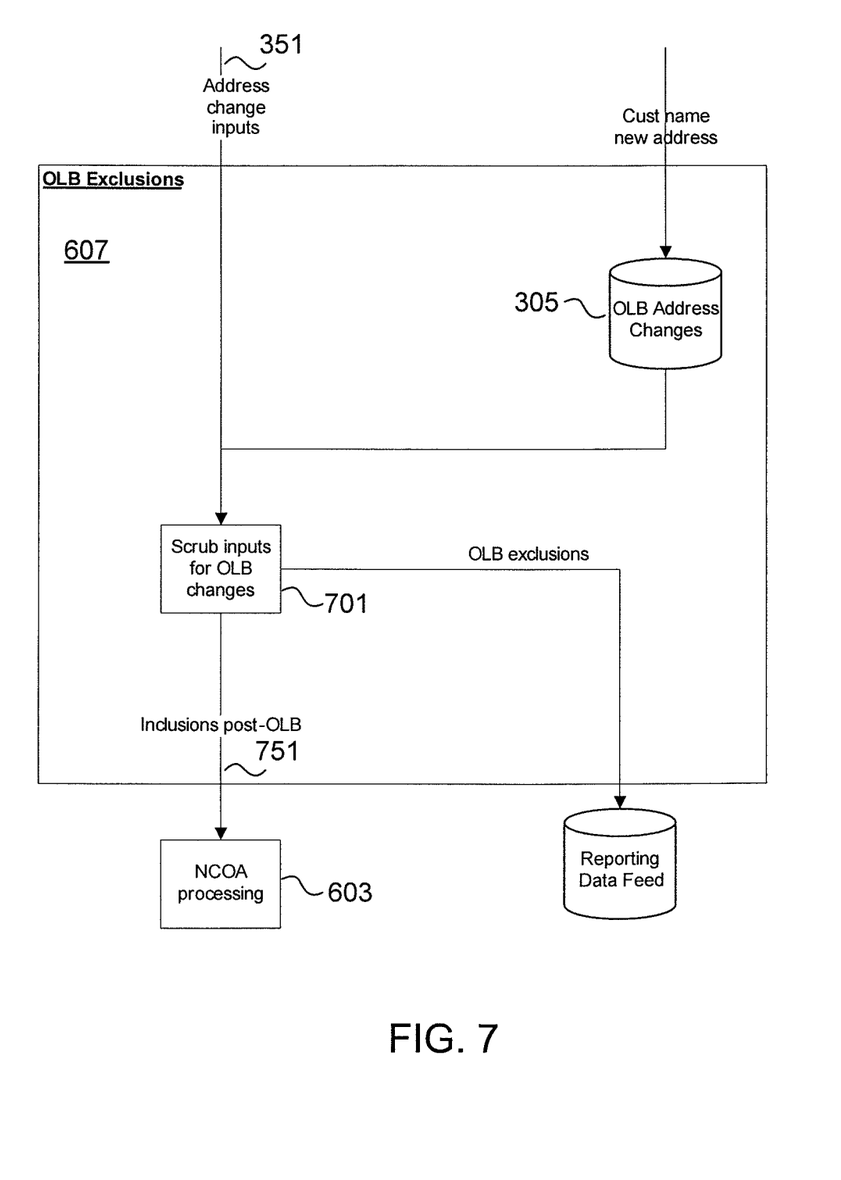
FIG. 7 shows on-line banking (OLB) exclusions in accordance with an aspect of the invention.

FIG. 7 shows on-line banking (OLB) exclusions processing 607 in accordance with an aspect of the invention. Module 701 processes change request inputs 351 to determine if the address change from data feeds 303 matches the new address submitted through on-line banking database 305. If so, the customer has submitted the same updated address through on-line banking and another channel, e.g., U.S. mail or telephone. Consequently the address request is excluded from further processing. Otherwise, inclusions post-OLB data 751, which contains change requests that are not excluded by processing 607, is sent to NCOA processing 603 so that system 300 can continue processing the address request.

Figure 8:
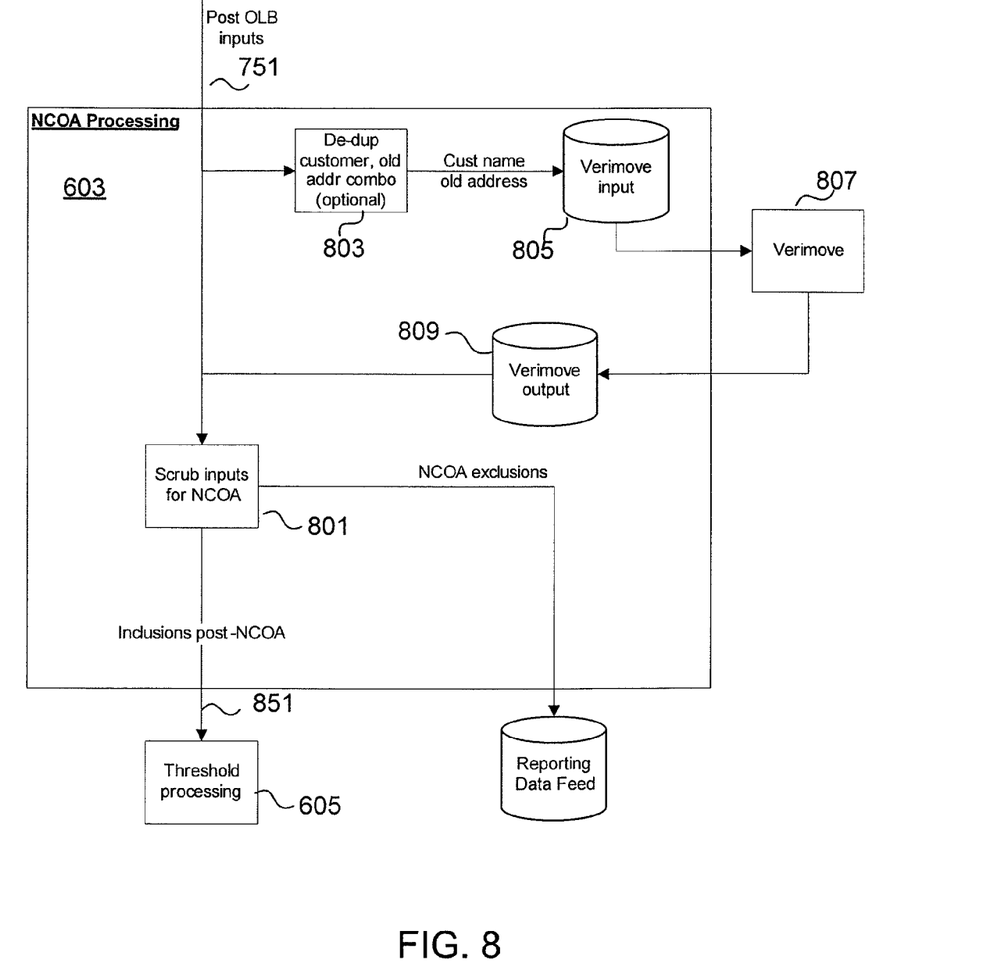
FIG. 8 shows National Change of Address (NCOA) processing in accordance with an aspect of the invention.

FIG. 8 shows NCOA processing 603 in accordance with an aspect of the invention. Processing 603 further processes inclusions post-OLB data 751 as provided by OLB exclusions processing 607. NCOA processing 603 provides inputs 805 (that may include the customer name and old address) to VeriMove™ software 807 (available from Pitney Bowes Business) to check customer records against the USPS National Change of Address (NCOA) database (NCOAL-ink®). With some embodiments, module 803 de-duplicates multiple address change records if the customer has moved multiple times and uses the latest address change for accessing the NCOA database.

Software 807 accesses the NCOA database in order to provide output 809 that is indicative of the new customer's address being in the NCOA data (i.e., the customer has previously updated the address with the USPS). Module 801 verifies whether there is an address match between post-OLB inputs 751 and output 809. If so, the address request is excluded. Otherwise, inclusions post-NCOA data 851 is further processed by threshold processing 605.

Figure 9:
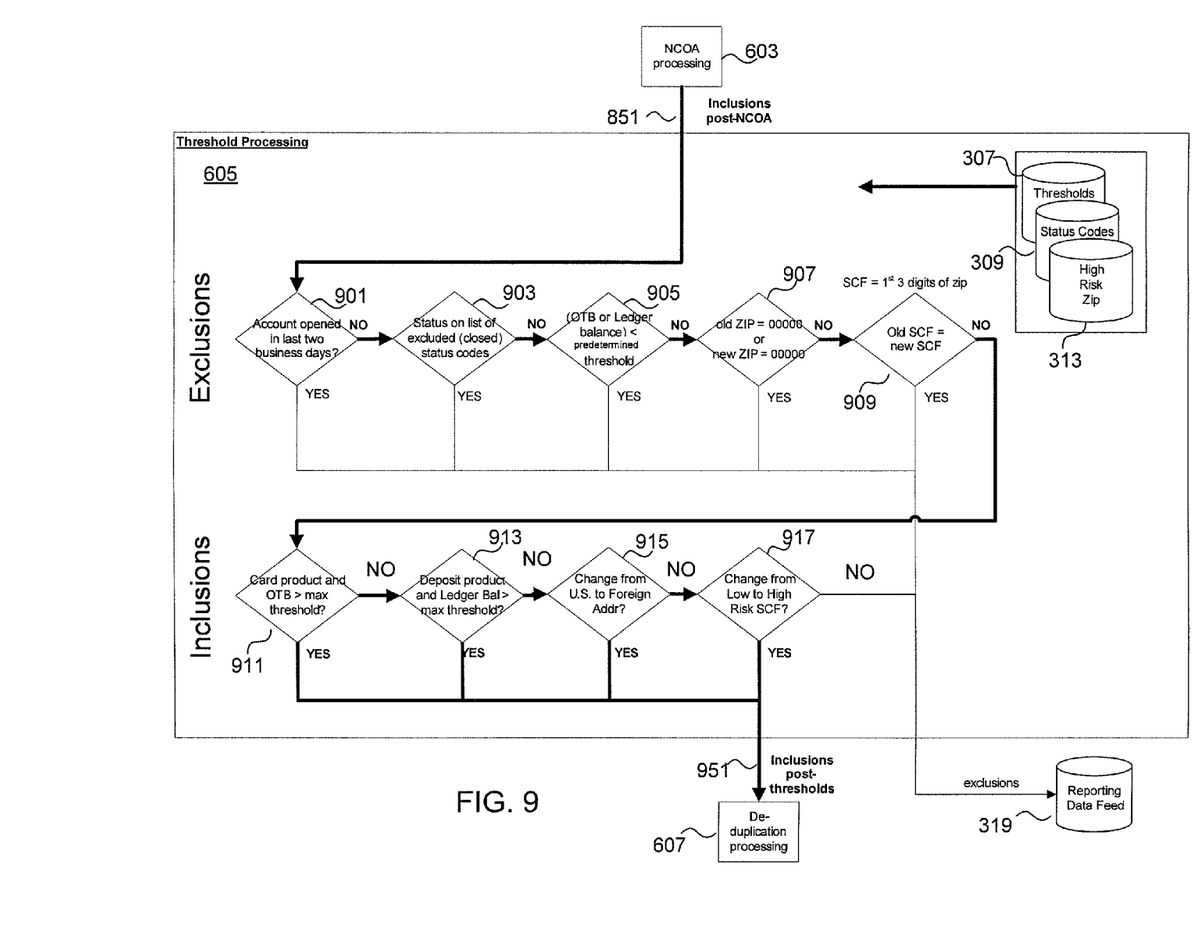
FIG. 9 shows threshold processing in accordance with an aspect of the invention.

FIG. 9 shows threshold processing 605 in accordance with an aspect of the invention. While threshold processing 605 processes credit card accounts and deposit accounts, other embodiment may process different or additional accounts, including debit card accounts, insurance accounts, money market accounts, and mortgage accounts.

If threshold processing 605 processes an address change request in data 851, the address change request has not matched address information from on-line banking or the NCOA database as previously discussed. For example, the new address submitted through the OLB website may not be the same as the new address as provided by data extract feeds 303.

Threshold processing 605 determines if the corresponding account has been opened in the last two business days in step 901. If so, the change request is excluded. For example, changes often occur due to errors in submitted information when opening an account. Otherwise, step 903 determines whether the account status is on the list of excluded status codes as provided by status codes database 309. For example, the account may have been closed so that a change notification should not be sent.

In step 905, if the account balance of the associated account is less than a minimum threshold, then the change request is excluded from further processing. Also, the change is excluded if no zip code information is available (corresponding to old ZIP or new ZIP=00000) in step 907 or if the old SCF equals the new SCF in step 909, where the old SCF is obtained from the old ZIP code and the new SCF is obtained from the new ZIP code. (The SCF (sectional center facility) corresponds to the three most significant digits of the ZIP code.)

Change requests that have not been excluded by steps 901, 903, 905, 907, or 909 are further processed by steps 911, 913, 915, and 917. Balances for different types of accounts are compared with corresponding predetermined thresholds (as provided by database 309) in steps 911 and 913. If the account balance exceeds the predetermined threshold, the change request is included, i.e., a change notification is generated.

Steps 915 and 917 analyze the attributes of the new address in the change request that are indicative of possible fraud. If step 915 determines that the address change is from a U.S. address to a foreign address, a change notification is initiated. Also, in step 917 if the address changes from a low risk SCF to a high risk SCF in accordance with ZIP database 313, an address change notification is sent to the customer.

Figure 10:
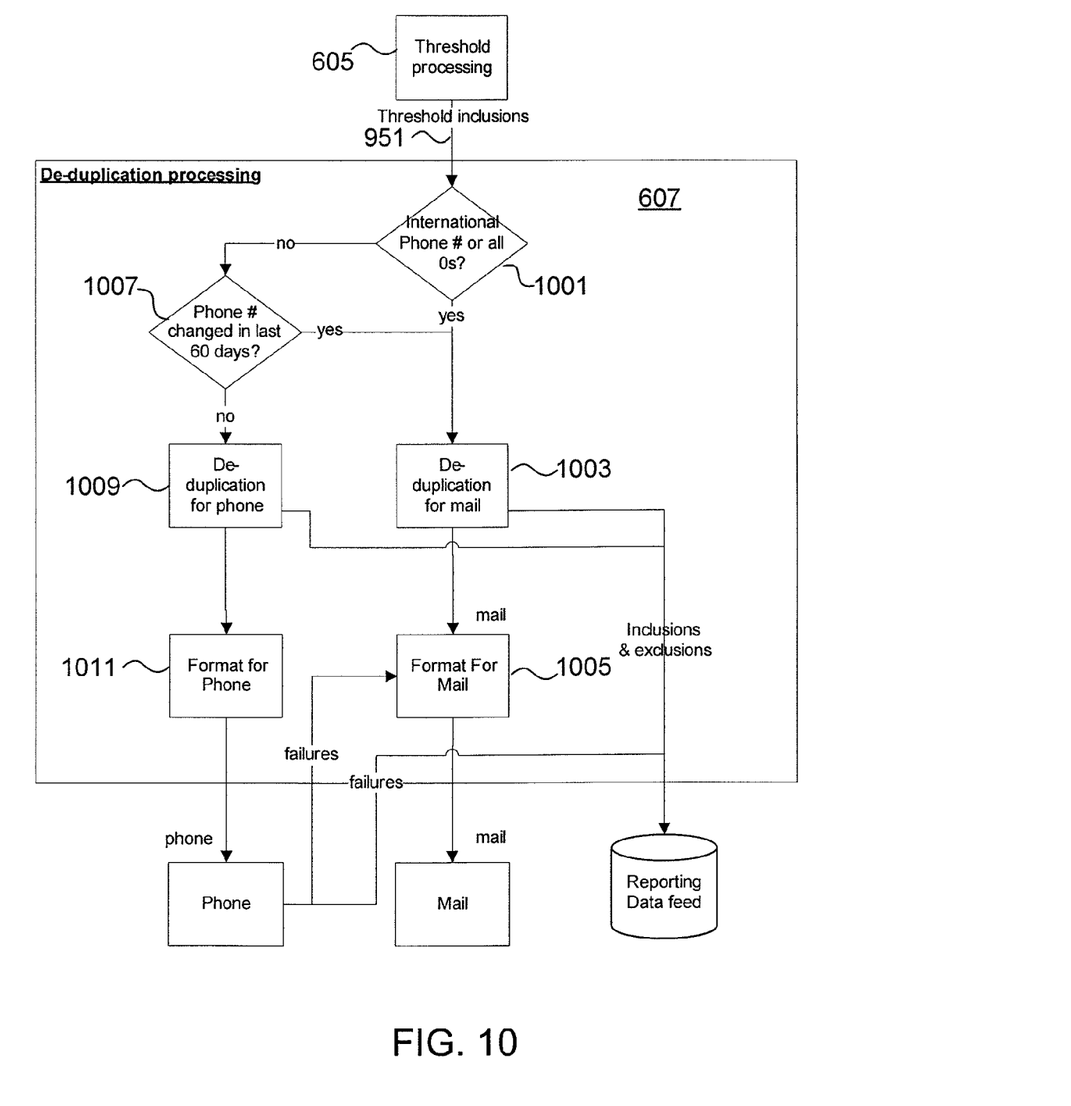
FIG. 10 shows de-duplication processing in accordance with an aspect of the invention.

Included change requests 951 are subsequently processed by de-duplication processing 607.

Figure 12:
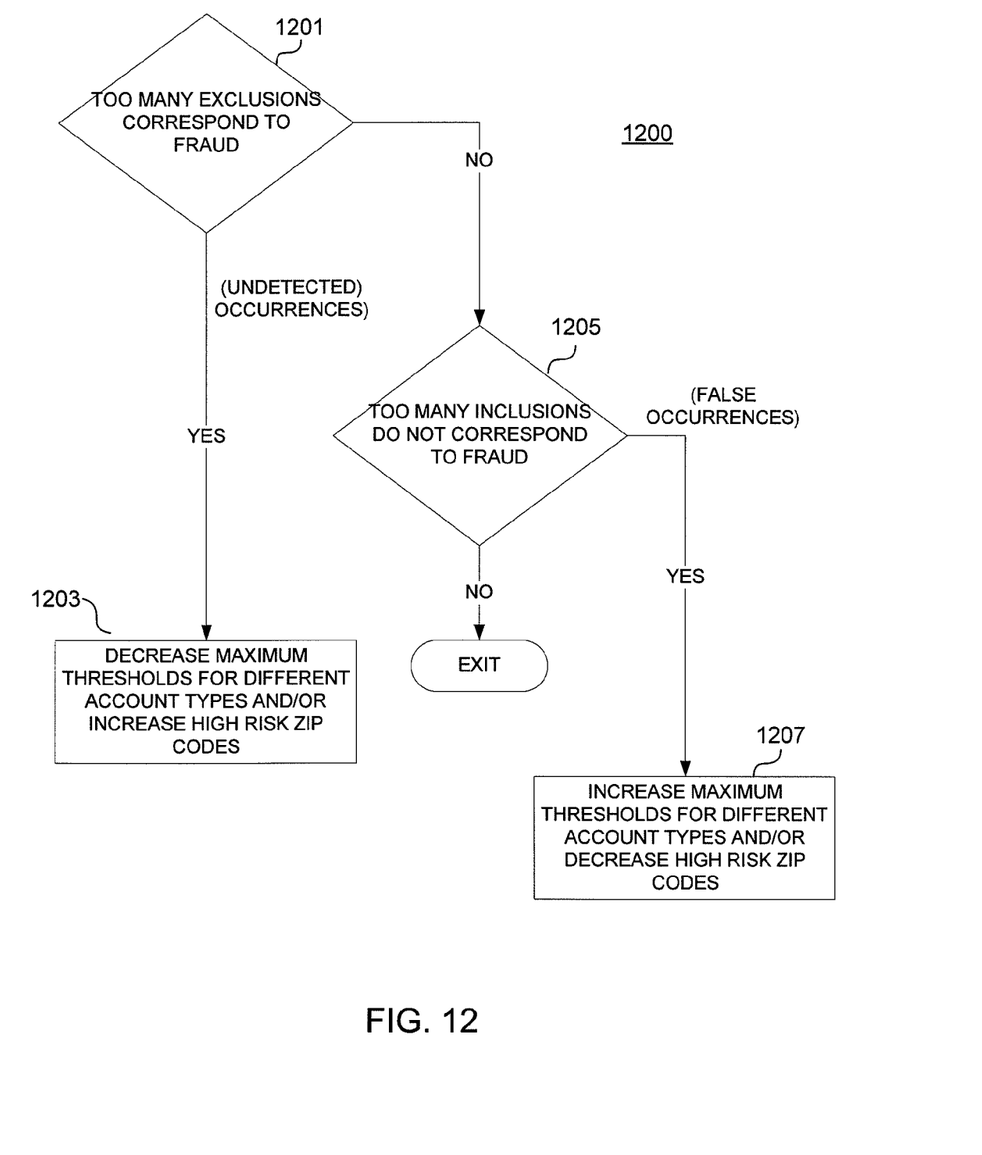
FIG. 12 shows adjusting processing parameters in accordance with an aspect of the invention.

Address changes that are excluded are stored in database 319 for later analysis so that threshold and other criteria parameters can be modified. Balance thresholds and other criteria can be adjusted based on fraud environment, customer response levels, and cost-to-operate considerations. With some embodiments, the analysis may be performed by fraud specialists. In other embodiments, some or all of the parameters may be adjusted by an automated process, e.g., process 1200 as shown in FIG. 12.

FIG. 10 shows de-duplication processing 607 of threshold inclusions 951 in accordance with an aspect of the invention. With some embodiments, a notification is delivered via telephone unless the telephone number of record is an international telephone number as determined in step 1001 or has changed in the last 60 days as determined in step 1007. De-duplication for mail notifications and for telephone notifications are performed by steps 1003 and 1009, respectively. The notification is then formatted for mail and for telephone by steps 1005 and 1011, respectively. With some embodiments, the formats are specified by an operational user, who enters verbiage for telephone notifications and mail notifications through a user interface.

Figure 11:
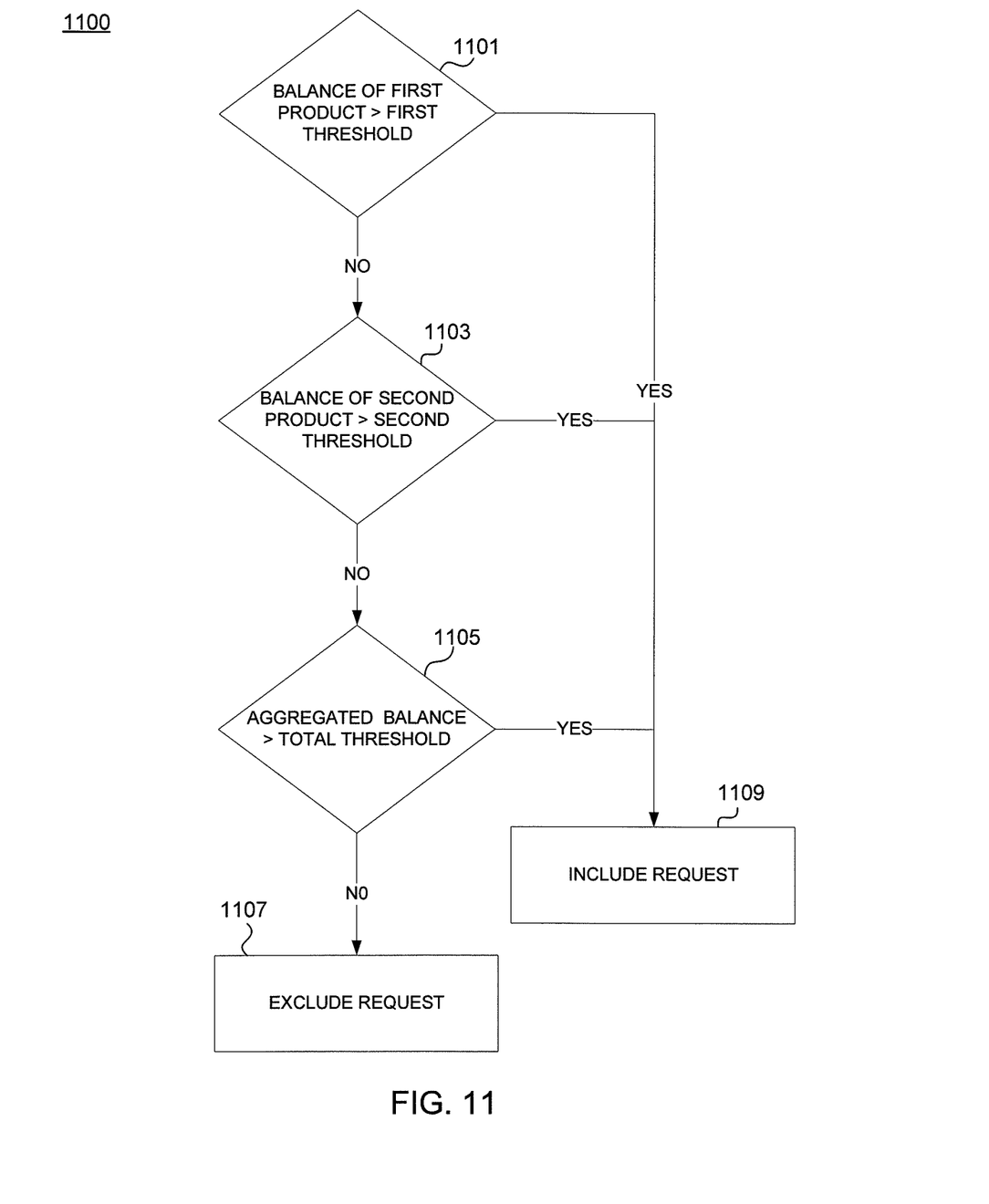
FIG. 11 shows threshold processing in accordance with an aspect of the invention.

FIG. 11 shows threshold processing 1100 in accordance with an aspect of the invention. As with threshold processing 605, as shown in FIG. 9, steps 1101 and 1103 determine whether balance information for different account types (e.g., credit cards and deposits) exceed maximum balance limits in steps 1101 and 1103. Also, step 1105 determines if aggregated balance information exceeds a total threshold when an account holder has a plurality of accounts.

As previously discussed, a fraud specialist may analyze information in reporting data feed 319 to determine if the number of exclusions and inclusions results in system 300 performing within performance objectives. For example, the fraud specialist may determine that there are too many exclusions because too many fraudulent requests are not detected by system 300. On the other hand, the fraud specialist may determine that there are too many inclusions because too many notifications are being generated for non-fraudulent requests.

With some embodiments, some of the processing parameters may be adjusted by system 300 without intervention by the fraud specialist. FIG. 12 shows processing parameters adjustment flow diagram 1200 in accordance with an aspect of the invention. Subsequent to processing the request, system 300 receives analysis information whether change requests are fraudulent. Step 1201 determines whether too many exclusions correspond to fraudulent requests (i.e., undetected occurrences at the time that system processes the change request.) If so, processing parameters may be adjusted. For example, the maximum balance thresholds (e.g., corresponding to steps 911 and 913) may be decreased and/or the number of high risk ZIP codes may be increased in step 1203. However, if too many inclusions do not correspond to fraudulent change requests (false occurrences) as determined by step 1205, the maximum thresholds may be increased and/or the number of high risk ZIP codes may be decreased in step 1207.

Aspects of the invention have been described in terms of illustrative embodiments thereof. Numerous other embodiments, modifications and variations within the scope and spirit of the appended claims will occur to persons of ordinary skill in the art from a review of this disclosure. For example, one of ordinary skill in the art will appreciate that the steps illustrated in the illustrative figures may be performed in other than the recited order, and that one or more steps illustrated may be optional in accordance with aspects of the invention.

We claim:

1. A computer-assisted method comprising:
receiving, by the processor, a request to change a customer address of an account holder for an account from an old address to a new address, the request corresponding to account information with balance information;
comparing, by the processor, the balance information with an account balance threshold;
when the balance information exceeds the account balance threshold, notifying the account holder of the request to change the customer address; and
when the balance information does not exceed the account balance threshold, continuing, by the processor, to process the request to determine whether a change notification is provided to the account holder.

2. The method of claim 1, further comprising:
when the new address matches with on-line banking (OLB) information, excluding the request from further processing so that no notification is sent to the account holder.

3. The method of claim 1, further comprising:
generating only one notification to the account holder when the account holder is associated with a plurality of accounts.

4. The method of claim 1, wherein the comparing comprises:
when the account information is for a first account type, comparing the account information to a first maximum account balance threshold; and
when the account information is for a second account type, comparing the account information to a second maximum account balance threshold.

5. The method of claim 1, further comprising:
obtaining updated address information from a national change of address (NCOA) database; and
when the updated address information matches the new address, excluding the request.

6. The method of claim 1, further comprising:
when postal zip information in the account information includes a high risk zip code, notifying the account holder of the request to change the customer address.

7. The method of claim 1, wherein the account holder is associated with a plurality of accounts, the method further comprising:
when aggregated balance information for the plurality of accounts exceeds a total account balance threshold, notifying the account holder of the request.

8. The method of claim 1, further comprising:
adjusting processing parameters based on exclusions resulting in undetected fraud occurrences and inclusions resulting in false fraud occurrences.

9. The method of claim 1, further comprising:
when account status in the account information is on a list of excluded status codes, excluding the request.

10. The method of claim 1, further comprising:
determining a form of notification to send to the account holder from a plurality of notification types.

11. A non-transitory computer-readable storage medium storing computer-executable instructions that, when executed, cause a processor to perform:
receiving a request to change a customer address of an account holder for an account from an old address to a new address, the request corresponding to account information with balance information;
when the balance information is less than a minimum account balance threshold, excluding the request;
when the balance information exceeds a maximum account balance threshold, notifying the account holder of the request to change the customer address; and
when the balance information does not exceed the account balance threshold, continuing to process the request to determine whether a notification is generated.

12. The computer-readable medium of claim 11, wherein the computer-executable instructions, when executed, cause the processor to perform:
when the new address matches with on-line banking (OLB) information, excluding the request from further processing so that no notification is sent to the account holder.

13. The computer-readable medium of claim 11, wherein the computer-executable instructions, when executed, cause the processor to perform:
generating only one notification to the account holder when the account holder is associated with a plurality of accounts.

14. The computer-readable medium of claim 11, wherein the computer-executable instructions, when executed, cause the processor to perform:
when the account information is for a first account type, comparing the account information to a first maximum account balance threshold; and
when the account information is for a second account type, comparing the account information to a second maximum account balance threshold.

15. The computer-readable medium of claim 11, wherein the computer-executable instructions, when executed, cause the processor to perform:
when the account holder is associated with a plurality of accounts and aggregated balance information for the plurality of accounts exceeds a total account balance threshold, notifying the account holder of the request.

16. The computer-readable medium of claim 11, wherein the computer-executable instructions, when executed, cause the processor to perform:
adjusting processing parameters based on exclusions resulting in undetected fraud occurrences and inclusions resulting in false fraud occurrences.

17. An apparatus comprising:
a memory; and
a processor coupled to the memory and configured to perform, based on instructions stored in the memory:
receiving a request to change an account address of an account holder for an account from an old address to a new address, the request corresponding to account information with balance information;
comparing the balance information with at least one account balance threshold;
determining that the balance information exceeds the at least one account balance threshold of a plurality of accounts for the account holder; and
generating only one notification to the account holder.

18. The apparatus of claim 17, wherein the processor is further configured to perform:
when the new address matches with on-line banking (OLB) information, excluding the request from further processing so that no notification is sent to the account holder.

19. The apparatus of claim 17, wherein the processor is further configured to perform:
when the balance information exceeds the at least one account balance threshold, notifying the account holder of the request to change the customer address; and
when the balance information does not exceed the at least one account balance threshold, continuing to process the request to determine whether a notification is generated.

20. The apparatus of claim 17, wherein the processor is further configured to perform:
when the account information is for a first account type, comparing the account information to a first maximum account balance threshold; and
when the account information is for a second account type, comparing the account information to a second maximum account balance threshold.

21. The apparatus of claim 17, wherein the processor is further configured to perform:
when an aggregated balance for the plurality of accounts exceeds a total account balance threshold, notifying the account holder of the request.

22. The apparatus of claim 17, wherein the processor is further configured to perform:
adjusting processing parameters based on exclusions resulting in undetected fraud occurrences and inclusions resulting in false fraud occurrences.

* * * * *